US011518875B2

(12) United States Patent
Sim et al.

(10) Patent No.: US 11,518,875 B2
(45) Date of Patent: Dec. 6, 2022

(54) THERMOPLASTIC RESIN COMPOSITION AND MOLDED ARTICLE FORMED THEREFROM

(71) Applicant: LOTTE CHEMICAL CORPORATION, Seoul (KR)

(72) Inventors: In Sik Sim, Uiwang-si (KR); Yoen Kyoung Kim, Uiwang-si (KR); Cheon Seok Yang, Uiwang-si (KR); Ju Sung Kim, Uiwang-si (KR); Seung Yong Bae, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 312 days.

(21) Appl. No.: 16/641,791

(22) PCT Filed: Aug. 14, 2018

(86) PCT No.: PCT/KR2018/009311
§ 371 (c)(1),
(2) Date: Feb. 25, 2020

(87) PCT Pub. No.: WO2019/078464
PCT Pub. Date: Apr. 25, 2019

(65) Prior Publication Data
US 2020/0354561 A1  Nov. 12, 2020

(30) Foreign Application Priority Data
Oct. 16, 2017 (KR) .................. 10-2017-0134229

(51) Int. Cl.
*C08L 51/04* (2006.01)
*C08L 35/06* (2006.01)
*C08L 51/00* (2006.01)
*C08L 77/12* (2006.01)

(52) U.S. Cl.
CPC ............. *C08L 51/04* (2013.01); *C08L 35/06* (2013.01); *C08L 51/006* (2013.01); *C08L 77/12* (2013.01)

(58) Field of Classification Search
CPC ................................. C08L 2205/035
See application file for complete search history.

(56) References Cited

U.S. PATENT DOCUMENTS

| 3,839,245 A | 10/1974 | Schlossman et al. |
| 4,356,300 A | 10/1982 | Isler et al. |
| 5,091,239 A * | 2/1992 | Przeworski ............... B65C 3/08 156/218 |
| 5,604,284 A | 2/1997 | Ueda et al. |
| 5,652,326 A | 7/1997 | Ueda et al. |
| 5,886,098 A * | 3/1999 | Ueda ........................ C08L 23/12 525/166 |
| 5,965,666 A * | 10/1999 | Koo ........................ C08L 77/00 525/76 |
| 10,113,049 B2 | 10/2018 | Murata et al. |
| 2014/0322487 A1 | 10/2014 | Choi et al. |
| 2015/0284559 A1 | 10/2015 | Tai |
| 2016/0202639 A1 | 7/2016 | Matsushita et al. |
| 2018/0134820 A1 | 5/2018 | Shindo et al. |
| 2018/0237630 A1 | 8/2018 | Bae et al. |

FOREIGN PATENT DOCUMENTS

| CN | 104169361 A | 11/2014 |
| EP | 0613919 A1 | 9/1994 |
| JP | 55-133424 A | 10/1980 |
| JP | 56-045419 A | 4/1981 |
| JP | 62-241945 A | 10/1987 |
| JP | 63-165451 A | 7/1988 |
| JP | 02-194052 A | 7/1990 |
| JP | 07-102136 A | 4/1995 |
| JP | 07-242794 A | 9/1995 |
| JP | 2006-052371 A | 2/2006 |
| JP | 2006-137929 A | 6/2006 |
| KR | 10-1996-0015810 A | 3/1995 |
| KR | 10-0147781 A | 6/1996 |
| KR | 10-2002-0037075 A | 5/2002 |
| KR | 10-2014-0135790 A | 11/2014 |
| WO | 2016/186142 A1 | 11/2016 |
| WO | 2017/057904 A1 | 4/2017 |
| WO | 2019/078464 A1 | 4/2019 |

OTHER PUBLICATIONS

International Search Report in counterpart International Application No. PCT/KR2018/009311 dated Nov. 19, 2018, pp. 1-4.
Extended Search Report in counterpart European Application No. 18868180.3 dated Sep. 1, 2021, pp. 1-6.
Office Action in counterpart Chinese Application No. 201880062612.X dated Jun. 8, 2022, pp. 1-7.

* cited by examiner

*Primary Examiner* — Ana L. Woodward
(74) *Attorney, Agent, or Firm* — Additon, Pendleton & Witherspoon, P.A.

(57) ABSTRACT

A thermoplastic resin composition according to the present invention comprises: a rubber-modified aromatic vinyl-based copolymer resin; an aliphatic polyamide resin; a poly(ether ester amide) block copolymer; a modified polyolefin resin; and a heat resistant vinyl-based copolymer resin. The thermoplastic resin composition exhibits excellent anti-static properties, heat resistance and mechanical properties.

13 Claims, No Drawings

THERMOPLASTIC RESIN COMPOSITION AND MOLDED ARTICLE FORMED THEREFROM

CROSS-REFERENCE TO RELATED APPLICATIONS

This application claims priority to and the benefit of International Application No. PCT/KR2018/009311, filed Aug. 14, 2018, which published as WO 2019/078464 on Apr. 25, 2019, and Korean Patent Application No. 10-2017-0134229, filed in the Korean Intellectual Property Office on Oct. 16, 2017, the entire disclosure of each of which is incorporated herein by reference.

TECHNICAL FIELD

The present invention relates to a thermoplastic resin composition and a molded article formed therefrom. More particularly, the present invention relates to a thermoplastic resin composition that exhibits good properties in terms of antistatic properties, heat resistance, mechanical properties, and the like, and a molded article formed therefrom.

BACKGROUND ART

A rubber-modified aromatic vinyl copolymer resin such as an acrylonitrile-butadiene-styrene copolymer resin (ABS resin) has good properties in terms of mechanical properties, processability, external appearance and the like, and is used for interior/exterior materials for electric/electronic products and automobiles, exterior materials for buildings, and the like.

However, a plastic product produced from a typical thermoplastic resin composition has insignificant absorbency of moisture in air and accumulates static electricity instead of conducting the static electricity, thereby causing surface contamination, static electricity impact, malfunction or failure of devices through adsorption of dust in air.

In order to secure suitable antistatic properties of a thermoplastic resin composition, an excess of an antistatic agent may be used, causing deterioration in heat resistance, compatibility and mechanical properties of the thermoplastic resin composition.

Therefore, there is a need for development of a thermoplastic resin composition exhibiting good properties in terms of antistatic properties, heat resistance, mechanical properties, and balance therebetween.

The background technique of the present invention is disclosed in Korean Patent Laid-open Publication No. 2014-0135790 and the like.

DISCLOSURE

Technical Problem

It is one aspect of the present invention to provide a thermoplastic resin composition exhibiting good properties in terms of antistatic properties, heat resistance, mechanical properties, and the like.

It is another aspect of the present invention to provide a molded article formed of the thermoplastic resin composition.

The above and other aspects of the present invention will become apparent from the detailed description of the following embodiments.

Technical Solution

One aspect of the present invention relates to a thermoplastic resin composition. The thermoplastic resin composition includes: a rubber-modified aromatic vinyl copolymer resin; an aliphatic polyamide resin; a poly(ether ester amide) block copolymer; a modified polyolefin resin; and a heat resistant vinyl copolymer resin.

In one embodiment, the thermoplastic resin composition may include: about 100 parts by weight of a base resin including about 60 wt % to about 90 wt % of the rubber-modified aromatic vinyl copolymer resin and about 10 wt % to about 40 wt % of the aliphatic polyamide resin; about 1 to about 15 parts by weight of the poly(ether ester amide) block copolymer; about 1 to about 10 parts by weight of the modified polyolefin resin; and about 1 to about 20 parts by weight of the heat resistant vinyl copolymer resin.

In one embodiment, the rubber-modified aromatic vinyl copolymer resin may include a rubber-modified vinyl graft copolymer and an aromatic vinyl copolymer resin.

In one embodiment, the rubber-modified vinyl graft copolymer may be obtained through graft-polymerization of a monomer mixture including an aromatic vinyl monomer and a vinyl cyanide monomer to a rubber polymer.

In one embodiment, the poly(ether ester amide) block copolymer may be a block copolymer of a reaction mixture comprising an amino carboxylic acid, lactam or diamine-dicarboxylic acid salt having 6 or more carbon atoms; a polyalkylene glycol; and a $C_4$ to $C_{20}$ dicarboxylic acid.

In one embodiment, the modified polyolefin resin may be obtained by imparting a polar group through graft copolymerization of at least one of maleic anhydride and an epoxy compound to a copolymer of an olefin and an aromatic vinyl monomer.

In one embodiment, the heat resistant vinyl copolymer resin may be a copolymer of at least one of a maleimide monomer and α-methylstyrene, a vinyl cyanide monomer, and an aromatic vinyl monomer excluding the α-methylstyrene.

In one embodiment, the poly(ether ester amide) block copolymer and the modified polyolefin resin may be present in a weight ratio of about 1.5:1 to about 5.1.

In one embodiment, the modified polyolefin resin and the heat resistant vinyl copolymer resin may be present in a weight ratio of about 1:1.1 to about 1:6.

In one embodiment, the thermoplastic resin composition may have a surface resistance of about $1\times10^6$ Ω·cm to about $5\times10^{10}$ Ω·cm, as measured in accordance with ASTM D257.

In one embodiment, the thermoplastic resin composition may have a charge-voltage half-life of about 0.5 seconds to about 3 seconds, as measured in accordance with KS K 0500.

In one embodiment, the thermoplastic resin composition may have a Vicat softening temperature of about 96° C. to about 100° C., as measured at a heating rate of 120±12° C./hr under a load of 5 kgf in accordance with ASTM D1525.

Another aspect of the present invention relates to a molded article. The molded article may be formed of the thermoplastic resin composition set forth above.

Advantageous Effects

The present invention provides a thermoplastic resin composition that has good properties in terms of antistatic properties, heat resistance, mechanical properties, and the like, and a molded article formed of the same.

BEST MODE

Hereinafter, embodiments of the present invention will be described in detail.

A thermoplastic resin composition according to the present invention includes (A) a rubber-modified aromatic vinyl copolymer resin; (B) an aliphatic polyamide resin; (C) a poly(ether ester amide) block copolymer; (D) a modified polyolefin resin; and (E) a heat resistant vinyl copolymer resin.

(A) Rubber-Modified Aromatic Vinyl Copolymer Resin

According to the present invention, the rubber-modified aromatic vinyl copolymer resin may include (A1) a rubber-modified vinyl graft copolymer and (A2) an aromatic vinyl copolymer resin.

(A1) Rubber-Modified Aromatic Vinyl Graft Copolymer

According to one embodiment of the invention, the rubber-modified vinyl graft copolymer may be obtained by graft polymerization of a monomer mixture comprising an aromatic vinyl monomer and a vinyl cyanide monomer to a rubber polymer. For example, the rubber-modified vinyl graft copolymer may be obtained by graft polymerization of the monomer mixture comprising the aromatic vinyl monomer and the vinyl cyanide monomer to the rubber polymer, in which the monomer mixture may further include a monomer for imparting processability and heat resistance to the monomer mixture, as needed. Here, polymerization may be performed by any typical polymerization method, such as emulsion polymerization, suspension polymerization, and the like. In addition, the rubber-modified vinyl graft copolymer may form a core (rubber polymer)-shell (copolymer of the monomer mixture) structure, without being limited thereto.

In some embodiments, the rubber polymer may include diene rubbers, such as polybutadiene, poly(styrene-butadiene), and poly(acrylonitrile-butadiene); saturated rubbers obtained by adding hydrogen to the diene rubbers; isoprene rubbers; $C_2$ to $C_{10}$ alkyl (meth)acrylate rubbers, a copolymer of a $C_2$ to $C_{10}$ alkyl (meth)acrylate and styrene; and ethylene-propylene-diene monomer terpolymer (EPDM). These may be used alone or as a mixture thereof. For example, the rubber polymer may include diene rubbers and (meth) acrylate rubbers. Specifically, the rubber polymer may include butadiene rubber and butyl acrylate rubber.

In some embodiments, the rubber polymer (rubber particle) may have an average particle diameter (D50) of about 0.05 µm to about 6 for example, about 0.15 µm to about 4 specifically about 0.25 µm to about 3.5 Within this range, the thermoplastic resin composition can have good properties in terms of impact resistance, external appearance, and the like.

In some embodiments, based on 100 wt % of the rubber-modified vinyl graft copolymer, the rubber polymer may be present in an amount of about 20 wt % to about 70 wt %, for example, about 25 wt % to about 60 wt %, and the monomer mixture (including the aromatic vinyl monomer and the vinyl cyanide monomer) may be present in an amount of about 30 wt % to about 80 wt %, for example, about 40 wt % to about 75 wt %. Within this range, the thermoplastic resin composition can have good properties in terms of impact resistance, external appearance, and the like.

In some embodiments, the aromatic vinyl monomer is a monomer copolymerizable with the rubber copolymer and may include, for example, styrene, α-methyl styrene, β-methyl styrene, p-methyl styrene, p-t-butyl styrene, ethyl styrene, vinyl xylene, monochlorostyrene, dichlorostyrene, dibromostyrene, and vinyl naphthalene, without being limited thereto. These may be used alone or as a mixture thereof. The aromatic vinyl monomer may be present in an amount of about 10 wt % to about 90 wt %, for example, about 40 wt % to about 90 wt %, based on 100 wt % of the monomer mixture. Within this range, the thermoplastic resin composition can have good properties in terms of processability, impact resistance, and the like.

In some embodiments, the vinyl cyanide monomer is copolymerizable with the aromatic vinyl monomer, and may include, for example, acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may be acrylonitrile and methacrylonitrile. The vinyl cyanide monomer may be present in an amount of about 10 wt % to about 90 wt %, for example, about 10 wt % to about 60 wt %, based on 100 wt % of the monomer mixture. Within this range, the thermoplastic resin composition can have good properties in terms of chemical resistance, mechanical properties, and the like.

In some embodiments, examples of the monomer for imparting processability and heat resistance may include (meth)acrylic acid, maleic anhydride, and N-substituted maleimide, without being limited thereto. The monomer for imparting processability and heat resistance may be present in an amount of about 15 wt % or less, for example, about 0.1 wt % to about 10 wt %, based on 100 wt % of the monomer mixture. Within this range, the monomer for imparting processability and heat resistance can impart processability and heat resistance to the thermoplastic resin composition without deterioration in other properties.

In some embodiments, examples of the rubber-modified vinyl graft copolymer may include a g-ABS copolymer obtained by grafting a styrene monomer and an acrylonitrile monomer to a butadiene-based rubber polymer, an acrylate-styrene-acrylonitrile (g-ASA) copolymer obtained by grafting a styrene monomer and an acrylonitrile monomer to a butyl acrylate-based rubber polymer, and the like.

In some embodiments, the rubber-modified vinyl graft copolymer may be present in an amount of about 20 wt % to about 50 wt %, for example, about 25 wt % to about 45 wt %, based on 100 wt % of the thermoplastic resin (including the rubber-modified vinyl graft copolymer and the aromatic vinyl copolymer resin). Within this range, the thermoplastic resin composition can exhibit good properties in terms of impact resistance, fluidity (molding processability), external appearance, and balance therebetween.

(A2) Aromatic Vinyl Copolymer Resin

According to the embodiment of the invention, the aromatic vinyl copolymer resin may be an aromatic vinyl copolymer resin used for a typical rubber-modified vinyl copolymer resin. For example, the aromatic vinyl copolymer resin may be a polymer of a monomer mixture comprising an aromatic vinyl monomer and a monomer copolymerizable with the aromatic vinyl monomer.

In some embodiments, the aromatic vinyl copolymer resin may be prepared by mixing the aromatic vinyl monomer and the monomer copolymerizable with the aromatic vinyl monomer, followed by polymerization. Here, polymerization may be carried out by any well-known polymerization method, such as emulsion polymerization, suspension polymerization, bulk polymerization, and the like.

In some embodiments, examples of the aromatic vinyl monomer may include styrene, α-methylstyrene, β-methylstyrene, p-methylstyrene, p-t-butylstyrene, ethylstyrene, vinyl xylene, monochlorostyrene, dichlorostyrene, dibromostyrene, and vinyl naphthalene. These may be used alone or as a mixture thereof. The aromatic vinyl monomer may be present in an amount of about 20 wt % to about 90 wt %, for example, about 30 wt % to about 80 wt %, based on 100 wt % of the aromatic vinyl copolymer resin. Within this range, the thermoplastic resin composition can exhibit good properties in terms of impact resistance, fluidity, and the like.

In some embodiments, the monomer copolymerizable with the aromatic vinyl monomer may include at least one of a vinyl cyanide monomer and an alkyl (meth)acrylic monomer. For example, the monomer copolymerizable with the aromatic vinyl monomer may include a vinyl cyanide monomer, or a vinyl cyanide monomer and an alkyl (meth)acrylic monomer, specifically a vinyl cyanide monomer and an alkyl (meth)acrylic monomer.

In some embodiments, examples of the vinyl cyanide monomer may include acrylonitrile, methacrylonitrile, ethacrylonitrile, phenylacrylonitrile, α-chloroacrylonitrile, and fumaronitrile, without being limited thereto. These may be used alone or as a mixture thereof. For example, acrylonitrile, methacrylonitrile, and the like may be used as the vinyl cyanide monomer.

In some embodiments, the alkyl (meth)acrylic monomer may include (meth)acrylic acid and/or $C_1$ to $C_{10}$ alkyl (meth)acrylates. These may be used alone or as a mixture thereof. For example, methyl methacrylate, methyl acrylate, and the like may be used as the alkyl (meth)acrylic monomer.

In some embodiments, when the monomer copolymerizable with the aromatic vinyl monomer is composed of a mixture of the vinyl cyanide monomer and the alkyl (meth)acrylic monomer, the vinyl cyanide monomer may be present in an amount of about 1 wt % to about 40 wt %, for example, about 2 wt % to about 35 wt %, and the alkyl (meth)acrylic monomer may be present in an amount of about 60 wt % to about 99 wt %, for example, about 65 wt % to about 98 wt %, based on 100 wt % of the monomer copolymerizable with the aromatic vinyl monomer. Within this range, the thermoplastic resin composition can exhibit good properties in terms of transparency, heat resistance, processability, and the like.

In some embodiments, the monomer copolymerizable with the aromatic vinyl monomer may be present in an amount of about 10 wt % to about 80 wt %, for example, about 20 wt % to about 70 wt %, based on 100 wt % of the aromatic vinyl copolymer resin. Within this range, the thermoplastic resin composition can exhibit good properties in terms of impact resistance, fluidity, and the like.

In some embodiments, the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin can exhibit good properties in terms of mechanical strength, formability, and the like.

In some embodiments, the aromatic vinyl copolymer resin may be present in an amount of about 50 wt % to about 80 wt %, for example, about 55 wt % to about 75 wt %, based on 100 wt % of the thermoplastic resin. Within this range, the thermoplastic resin composition can exhibit good properties in terms of impact resistance, fluidity (molding processability), and the like.

In one embodiment, the rubber-modified aromatic vinyl copolymer resin (A) may be present in an amount of about 60 wt % to about 90 wt %, for example, about 65 wt % to about 85 wt %, based on 100 wt % of the base resin including the rubber-modified aromatic vinyl copolymer resin and the aliphatic polyamide resin ((A)+(B)). Within this range, the thermoplastic resin composition can exhibit good antistatic properties, mechanical properties, and the like.

(B) Aliphatic Polyamide Resin

According to the embodiment of the invention, the aliphatic polyamide resin serves to improve antistatic and other properties of the thermoplastic resin composition even in use of a small amount of an antistatic agent, and may be selected from typical aliphatic polyamide resins.

In some embodiments, the aliphatic polyamide resin may include at least one of polyamide 6, polyamide 11, polyamide 12, polyamide 4.6, polyamide 6.6, polyamide 6.10, and a combination thereof. For example, the aliphatic polyamide resin may be polyamide 6, polyamide 6.6, or polyamide 12.

In some embodiments, the aliphatic polyamide resin may have a relative viscosity (RV) of about 2.0 to about 3.5, for example, about 2.3 to about 3.2, as measured in a sulfuric acid solution (96%) at 25° C. using an Ubbelohde viscometer.

In some embodiment, the aliphatic polyamide resin (B) may be present in an amount of about 10 wt % to about 40 wt %, for example, about 15 wt % to about 35 wt %, based on 100 wt % of the base resin including the rubber-modified aromatic vinyl copolymer resin and the aliphatic polyamide resin ((A)+(B)). Within this range, the thermoplastic resin composition can exhibit good antistatic properties, mechanical properties, and the like.

(C) Poly(Ether Ester Amide) Block Copolymer

According to the embodiment of the invention, the poly (ether ester amide) block copolymer serves to improve antistatic and other properties of the thermoplastic resin composition (specimen), and may be selected from any poly(ether ester amide) block copolymers typically used as an antistatic agent. For example, the poly(ether ester amide) block copolymer may be a block copolymer of a reaction mixture comprising an amino carboxylic acid, lactam or diamine-dicarboxylic acid salt having 6 or more carbon atoms; a polyalkylene glycol; and a $C_4$ to $C_{20}$ dicarboxylic acid.

In some embodiments, examples of the amino carboxylic acid, lactam or diamine-dicarboxylic acid salt having 6 or more carbon atoms may include aminocarboxylic acids, such as ω-aminocaproic acid, w-aminoenanthic acid, ω-aminocaprylic acid, ω-aminopelargonic acid, ω-aminocapric acid, 1,1-aminoundecanoic acid, 1,2-aminododecanoic acid, and the like; lactams, such as caprolactam, enantolactam, capryl lactam, lauryl lactam, and the like; and salts of diamines and dicarboxylic acids, such as salts of hexamethylenediamine-adipic acid, salts of hexamethylene diamine-isophthalic acid, and the like. For example, 1,2-aminododecanoic acid, caprolactam, and salts of hexamethylene diamine-adipic acid may be used.

In some embodiments, examples of the polyalkylene glycol may include polyethylene glycol, poly(1,2- and 1,3-propylene glycol), polytetramethylene glycol, polyhexamethylene glycol, a block or random copolymer of ethylene glycol and propylene glycol, and a copolymer of ethylene glycol and tetrahydrofuran. For example, polyethylene glycol, a copolymer of ethylene glycol and propylene glycol, and the like may be used.

In some embodiments, examples of the $C_4$ to $C_{20}$ dicarboxylic acid may include terephthalic acid, 1,4-cyclohexacarboxylic acid, sebacic acid, adipic acid, and dodecane carboxylic acid.

In some embodiments, a bond between the amino carboxylic acid, lactam or diamine-dicarboxylic acid salt having 6 or more carbon atoms and the polyalkylene glycol may be an ester bond; a bond between the amino carboxylic acid, lactam or diamine-dicarboxylic acid salt having 6 or more carbon atoms and the $C_4$ to $C_{20}$ dicarboxylic acid may be an amide bond; and a bond between the polyalkylene glycol and the $C_4$ to $C_{20}$ dicarboxylic acid may be an ester bond.

In some embodiments, the polyetheresteramide block copolymer may be prepared by a well-known method in the art, for example, by a method disclosed in JP Patent Publication No. S56-045419 or JP Unexamined Patent Publication No. S55-133424.

In some embodiments, the poly(ether ester amide) block copolymer may include about 10 wt % to about 95 wt % of the polyether-ester block. Within this range, the thermoplastic resin composition can have good mechanical properties, antistatic properties, and the like.

In one embodiment, the poly(ether ester amide) block copolymer may be present in an amount of about 1 to about 15 parts by weight, for example, about 2 to about 12 parts by weight, specifically about 5 to about 10 parts by weight, relative to about 100 parts by weight of the base resin including the rubber-modified aromatic vinyl copolymer resin and the aliphatic polyamide resin ((A)+(B)). Within this range, the thermoplastic resin composition can exhibit good antistatic properties, mechanical properties, and the like.

(D) Modified Polyolefin Resin

According to the embodiment of the invention, the modified polyolefin resin serves to improve antistatic properties, heat resistance and other properties of the thermoplastic resin composition through improvement in compatibility and dispersion of components of the thermoplastic resin composition, and may be obtained by imparting a polar group through graft copolymerization of maleic anhydride (MAH), an epoxy compound or a combination thereof to a copolymer of an olefin and an aromatic vinyl monomer.

In some embodiments, examples of the epoxy compound may include glycidyl (meth)acrylate, allyl glycidyl ether, 2-methyl allyl glycidyl ether, and the like.

In some embodiment, the modified polyolefin resin may be obtained through graft polymerization of maleic anhydride, an epoxy compound or a combination thereof to a copolymer of a monomer mixture of an olefin, such as ethylene and α-olefin, and an aromatic vinyl monomer, such as styrene. For example, the modified polyolefin resin may be prepared through a reaction extrusion process using a twin-axis extruder, in which maleic anhydride, an epoxy compound or a combination thereof is introduced into an ethylene group by adding a peroxide to a modified polyolefin resin, such as a styrene-ethylene-butadiene-styrene (SEBS) copolymer having a melt-flow index (MI) of 10 to 50 g/10 min, to disconnect the ethylene bond while generating free radical groups.

In some embodiments, the modified polyolefin resin may be present in an amount of about 1 to about 10 parts by weight, for example, about 1 to about 5 parts by weight, relative to about 100 parts by weight of the base resin including the rubber-modified aromatic vinyl copolymer resin and the aliphatic polyamide resin ((A)+(B)). Within this range, the thermoplastic resin composition can exhibit good properties in terms of antistatic properties, heat resistance, mechanical properties, and the like.

In some embodiments, the poly(ether ester amide) block copolymer and the modified polyolefin resin may be present in a weight ratio ((C):(D)) of about 1.5:1 to about 5:1. Within this range, the thermoplastic resin composition can exhibit good properties in terms of antistatic properties, heat resistance, mechanical properties, and the like.

(E) Heat Resistant Vinyl Copolymer Resin

According to the embodiment of the invention, the heat resistant vinyl copolymer resin serves to improve heat resistance and other properties of the thermoplastic resin composition, and may be, for example, a copolymer of a monomer mixture including a maleimide monomer and/or α-methylstyrene, an aromatic vinyl monomer, and a vinyl cyanide monomer.

In some embodiments, the maleimide monomer may be an N-substituted maleimide such as N-phenyl maleimide (PMI). The maleimide monomer and/or α-methylstyrene may be present in an amount of about 0.1 wt % to about 15 wt %, for example, about 1 wt % to about 10 wt %, based on 100 wt % of the monomer mixture. Within this range, the heat resistant vinyl copolymer resin can impart heat resistance and other properties to the thermoplastic resin composition.

In some embodiments, the aromatic vinyl monomer may include aromatic vinyl monomers excluding α-methylstyrene, for example, styrene, ethylstyrene, vinyl xylene, monochlorostyrene, dichlorostyrene, dibromostyrene, vinyl naphthalene, and the like. These may be used alone or as a mixture thereof. The aromatic vinyl monomer may be present in an amount of about 10 wt % to about 90 wt %, for example, about 40 wt % to about 90 wt %, based on 100 wt % of the monomer mixture. Within this range, the thermoplastic resin composition can have good properties in terms of processability, impact resistance, and the like.

In some embodiments, examples of the vinyl cyanide monomer may include acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may be acrylonitrile and methacrylonitrile. The vinyl cyanide monomer may be present in an amount of about 5 wt % to about 90 wt %, for example, about 5 wt % to about 60 wt %, based on 100 wt % of the monomer mixture. Within this range, the thermoplastic resin composition can have good properties in terms of chemical resistance, mechanical properties, and the like.

In some embodiments, the heat resistant vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin exhibits good properties in terms of heat resistance, mechanical strength, formability, and the like.

In some embodiments, the heat resistant vinyl copolymer resin may be present in an amount of about 1 to about 20 parts by weight, for example, about 5 to about 15 parts by weight, relative to about 100 parts by weight of the base resin including the rubber-modified aromatic vinyl copolymer resin and the aliphatic polyamide resin ((A)+(B)). Within this range, the thermoplastic resin composition can exhibit good properties in terms of heat resistance, mechanical properties, and the like.

In one embodiment, the modified polyolefin resin and the heat resistant vinyl copolymer resin may be present in a weight ratio of about 1:1.1 to about 1:6. Within this range, the thermoplastic resin composition can exhibit good properties in terms of heat resistance, mechanical properties, and the like.

According to one embodiment of the invention, the thermoplastic resin composition may further include additives used in typical thermoplastic resin compositions. Examples of the additives may include a flame retardant, fillers, an antioxidant agent, an anti-dripping agent, a lubricant, a release agent, a nucleating agent, an antistatic agent, a stabilizer, a pigment, a dye, and a mixture thereof, without being limited thereto. The additives may be present in an amount of about 0.001 to about 40 parts by weight, for example, about 0.1 to about 10 parts by weight, relative to about 100 parts by weight of the thermoplastic resin.

According to one embodiment of the invention, the thermoplastic resin composition may be prepared in pellet form by mixing the aforementioned components, followed by melt extrusion using a typical twin-screw extruder at about 200° C. to about 280° C., for example, about 220° C. to about 250° C.

In some embodiments, the thermoplastic resin composition may have a surface resistance of about $1 \times 10^6$ Ω·cm to about $5 \times 10^{10}$ Ω·cm, for example, about $1 \times 10^9$ Ω·cm to about $4 \times 10^{10}$ Ω·cm, as measured in accordance with ASTM D257.

In some embodiments, the thermoplastic resin composition may have a charge-voltage half-life of about 0.5 seconds to about 3 seconds, for example, about 1 second to about 2 seconds, as measured in accordance with KS K 0500.

In some embodiments, the thermoplastic resin composition may have a Vicat softening temperature of about 96° C. to about 100° C., for example, about 97° C. to about 99° C., as measured at a heating rate of 120±12° C./hr under a load of 5 kgf in accordance with ASTM D1525.

A molded article according to the present invention is produced from the thermoplastic resin composition. The thermoplastic resin composition may be prepared in pellet form and the prepared pellets may be produced into various molded articles (products) by various molding methods, such as injection molding, extrusion, vacuum molding, and casting. Such molding methods are well known to those skilled in the art. The molded articles exhibit good antistatic properties, heat resistance, mechanical properties, and balance therebetween, and thus may be used for interior/exterior materials for electric/electronic products and automobiles, exterior materials for buildings, and the like.

MODE FOR INVENTION

Next, the present invention will be described in more detail with reference to some examples. It should be understood that these examples are provided for illustration only and are not to be construed in any way as limiting the invention.

EXAMPLE

Details of components used in Examples and Comparative Examples are as follows.

(A) Rubber-Modified Aromatic Vinyl Copolymer Resin

A rubber-modified aromatic vinyl copolymer resin obtained by mixing 30 wt % of (A1) a rubber-modified aromatic vinyl graft copolymer and 70 wt % of (A2) an aromatic vinyl copolymer resin was used.

(A1) Rubber-Modified Aromatic Vinyl Graft Copolymer

A g-ABS copolymer obtained by grafting 55 wt % of a mixture comprising styrene and acrylonitrile (weight ratio: 75/25) to 45 wt % of butadiene rubber having a Z-average particle diameter of 310 nm was used.

(A2) Aromatic Vinyl Copolymer Resin

A SAN resin (weight average molecular weight: 130,000 g/mol) obtained through polymerization of 71 wt % of styrene and 29 wt % of acrylonitrile was used.

(B) Polyamide Resin (B1) As an aliphatic polyamide resin, polyamide 6 (Manufacturer: KP Chemtech, Product Name: EN-300) was used.

(B2) As an aromatic polyamide resin, polyamide 6T (Manufacturer: DuPont, Product Name: HTN 501) was used.

(C) Poly(Ether Ester Amide) Block Copolymer

PELECTRON AS (PA6-PEO, Manufacturer: Sanyo) was used.

(D) Modified Polyolefin Resin

MAH-SEBS (Manufacturer: Shell Chemicals, Product Name: KRATON FG1901X) was used.

(E) Heat Resistant Vinyl Copolymer Resin

PMI-SAN (Manufacturer: Denka IP, Product Name: MS-NI) was used.

(F) Compatibilizer (F1) A styrene-maleic anhydride copolymer (SMA resin, Manufacturer: Polyscope, Product Name: sz26080) was used.

(F2) SEBS (Manufacturer: SHELL CHEM, Product Name: KRATON G1651) was used.

Examples 1 to 2 and Comparative Examples 1 to 6

The above components were weighed in amounts as listed in Table 1 and subjected to extrusion at 230° C., thereby preparing pellets. Extrusion was performed using a twin-screw extruder (L/D=36, Φ: 45 mm). The prepared pellets were dried at 80° C. for 2 hours or more and injection-molded in a 6 oz. injection molding machine (molding temperature: 230° C., mold temperature: 60° C.), thereby preparing specimens. The prepared specimens were evaluated as to the following properties by the following method, and results are shown in Table 1.

Property Measurement (1) Surface resistance (unit: Ω·cm): Surface resistance was measured using a surface resistance tester (Model: Hiresta-UP(MCP-HT450), Manufacturer: Mitsubishi Chemical Co., Ltd.) in accordance with ASTM D257.

(2) Half-life (unit: second): Half-life of charge voltage was measured on five specimens each having a size of 4.5 cm×4.5 cm in accordance with KS K 0500.

① A half-life tester was connected to a synchroscope or a recorder.

② Application voltage was set to (+)10,000 V.

③ A distance from a tip end of a needle electrode of an application unit to a surface of a turntable was adjusted to 20 mm and a distance from an electrode plate of a reception unit to the surface of the turntable was adjusted to 15 mm.

④ Electricity was removed by attaching one specimen to an attachment frame such that a surface of the specimen faces upwards.

⑤ A voltage of 10,000 V was applied to the specimen for 30 minutes while rotating the turntable, followed by measuring a period of time (second) until charge voltage was reduced to half while rotating the turntable.

(3) Heat resistance: Vicat softening temperature (VST) (unit: ° C.) was measured at a heating rate of 120±12° C./hr under a load of 5 kgf in accordance with ASTM D1525.

TABLE 1

|  | Example | | Comparative Example | | | | | |
|---|---|---|---|---|---|---|---|---|
|  | 1 | 2 | 1 | 2 | 3 | 4 | 5 | 6 |
| (A) (wt %) | 80 | 70 | 80 | 80 | 80 | 80 | 80 | 80 |
| (B1) (wt %) | 20 | 30 | 20 | 20 | — | 20 | 20 | 20 |
| (B2) (wt %) | — | — | — | — | 20 | — | — | — |
| (C) (parts by weight) | 8 | 8 | 8 | 8 | 8 | — | 8 | 8 |
| (D) (parts by weight) | 4 | 2 | — | 4 | 4 | 4 | — | — |
| (E) (parts by weight) | 5 | 10 | 5 | — | 5 | 5 | 5 | 5 |
| (F1) (parts by weight) | — | — | — | — | — | — | 4 | — |
| (F2) (parts by weight) | — | — | — | — | — | — | — | 4 |
| Surface resistance ($\Omega \cdot cm$) | $3.5 \times 10^{10}$ | $2.0 \times 10^{10}$ | $2.8 \times 10^{11}$ | $3.0 \times 10^{10}$ | $1.1 \times 10^{11}$ | $3.6 \times 10^{14}$ | $5.0 \times 10^{11}$ | $8.1 \times 10^{11}$ |
| Half-life (second) | 1 | 1 | 7 | 1 | 5 | >300 | 12 | 15 |
| Heat resistance (VST, ° C.) | 98.2 | 97.6 | 98.5 | 90.8 | 103.2 | 100.3 | 97.1 | 97.5 |

*parts by weight: parts by weight relative to 100 parts by weight of base resin ((A) + (B))

From the result, it could be seen that the thermoplastic resin compositions according to the present invention exhibited good antistatic properties, heat resistance, and the like.

On the contrary, it could be seen that the thermoplastic resin composition prepared without using the modified polyolefin resin or prepared using other resins (Comparative Examples 1, 5 and 6) suffered from deterioration in surface resistance and half-life through deterioration in compatibility; the thermoplastic resin composition prepared without using the heat resistant vinyl copolymer resin (Comparative Example 2) suffered from deterioration in heat resistance and the like; the thermoplastic resin composition prepared using an aromatic polyamide resin (Comparative Example 3) suffered from deterioration in surface resistance and half-life through deterioration in formability; and the thermoplastic resin composition prepared without using the poly(ether ester amide) block copolymer (Comparative Example 4) suffered from deterioration in surface resistance and the like.

It should be understood that various modifications, changes, alterations, and equivalent embodiments can be made by those skilled in the art without departing from the spirit and scope of the present invention.

The invention claimed is:

1. A thermoplastic resin composition comprising:
a rubber-modified aromatic vinyl copolymer resin;
an aliphatic polyamide resin;
a poly(ether ester amide) block copolymer;
a modified polyolefin resin obtained by imparting a polar group through graft copolymerization of maleic anhydride and/or an epoxy compound to a copolymer of an olefin and an aromatic vinyl monomer; and
a heat resistant vinyl copolymer resin comprising a copolymer of a maleimide monomer and/or α-methylstyrene, a vinyl cyanide monomer, and an aromatic vinyl monomer excluding the α-methylstyrene,
wherein the poly(ether ester amide) block copolymer and the modified polyolefin resin are present in a weight ratio of about 1.5:1 to about 5:1.

2. The thermoplastic resin composition according to claim 1, comprising: about 100 parts by weight of a base resin including about 60 wt % to about 90 wt % of the rubber-modified aromatic vinyl copolymer resin and about 10 wt % to about 40 wt % of the aliphatic polyamide resin; about 1 to about 15 parts by weight of the poly(ether ester amide) block copolymer; about 1 to about 10 parts by weight of the modified polyolefin resin; and about 1 to about 20 parts by weight of the heat resistant vinyl copolymer resin.

3. The thermoplastic resin composition according to claim 1, wherein the rubber-modified aromatic vinyl copolymer resin comprises a rubber-modified vinyl graft copolymer and an aromatic vinyl copolymer resin.

4. The thermoplastic resin composition according to claim 3, wherein the rubber-modified vinyl graft copolymer is obtained through graft-polymerization of a monomer mixture comprising an aromatic vinyl monomer and a vinyl cyanide monomer to a rubber polymer.

5. The thermoplastic resin composition according to claim 1, wherein the poly(ether ester amide) block copolymer is a block copolymer of a reaction mixture comprising an amino carboxylic acid, lactam or diamine-dicarboxylic acid salt having 6 or more carbon atoms; a polyalkylene glycol; and a $C_4$ to $C_{20}$ dicarboxylic acid.

6. The thermoplastic resin composition according to claim 1, wherein the modified polyolefin resin and the heat resistant vinyl copolymer resin are present in a weight ratio of about 1:1.1 to about 1:6.

7. The thermoplastic resin composition according to claim 1, wherein the thermoplastic resin composition has a surface resistance of about $1 \times 10^6$ $\Omega \cdot cm$ to about $5 \times 10^{10}$ $\Omega \cdot cm$, as measured in accordance with ASTM D257.

8. The thermoplastic resin composition according to claim 1, wherein the thermoplastic resin composition has a charge-voltage half-life of about 0.5 seconds to about 3 seconds, as measured in accordance with KS K 0500.

9. The thermoplastic resin composition according to claim 1, wherein the thermoplastic resin composition has a Vicat softening temperature of about 96° C. to about 100° C., as measured at a heating rate of 120±12° C./hr under a load of 5 kgf in accordance with ASTM D1525.

10. A molded article formed of the thermoplastic resin composition according to claim 1.

11. The thermoplastic resin composition according to claim 1, wherein the thermoplastic resin composition has a surface resistance of about $1\times10^6$ Ω·cm to about $5\times10^{10}$ Ω·cm, as measured in accordance with ASTM D257 and a Vicat softening temperature of about 96° C. to about 100° C., as measured at a heating rate of 120±12° C./hr under a load of 5 kgf in accordance with ASTM D1525.

12. The thermoplastic resin composition according to claim 11, wherein the thermoplastic resin composition has a charge-voltage half-life of about 0.5 seconds to about 3 seconds, as measured in accordance with KS K 0500.

13. The thermoplastic resin composition according to claim 1, wherein the heat resistant vinyl copolymer resin comprises a copolymer of a maleimide monomer, a vinyl cyanide monomer, and an aromatic vinyl monomer excluding α-methylstyrene.

* * * * *